May 12, 1925.　　　　　　　　　　　　　　　1,537,801
F. B. COCKBURN
COMBINED TURNING AND MILLING LATHE
Filed Aug. 18, 1922　　　5 Sheets-Sheet 1

Francis B. Cockburn
INVENTOR

BY Wood & Wood
ATTORNEYS

May 12, 1925. 1,537,801
F. B. COCKBURN
COMBINED TURNING AND MILLING LATHE
Filed Aug. 18, 1922  5 Sheets-Sheet 2

Francis B. Cockburn
INVENTOR:
BY Wood & Wood
ATTORNEYS

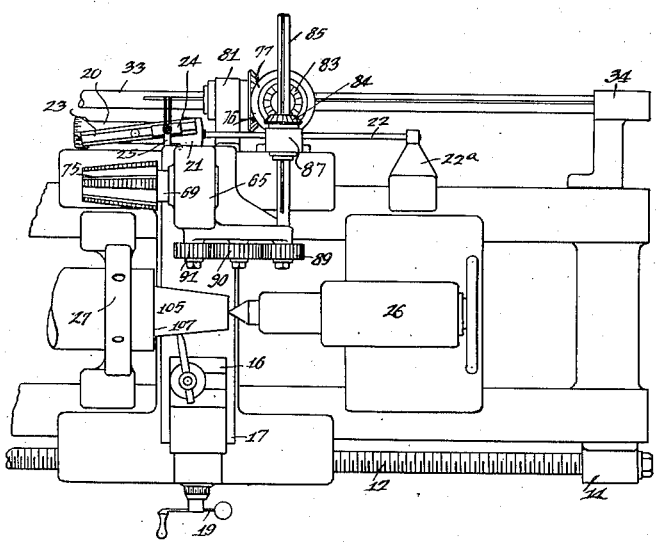
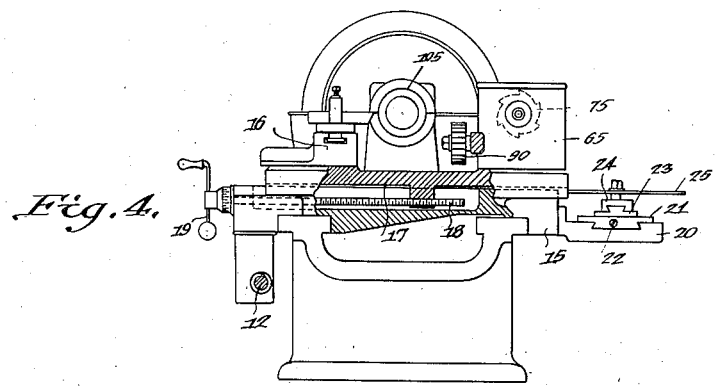

May 12, 1925.  
F. B. COCKBURN  
1,537,801  
COMBINED TURNING AND MILLING LATHE  
Filed Aug. 18, 1922   5 Sheets-Sheet 4

Francis B. Cockburn  
INVENTOR:  
BY Wood & Wood  
ATTORNEYS

May 12, 1925.　　　　　　　　　　　　　　　　　　　　　1,537,801
F. B. COCKBURN
COMBINED TURNING AND MILLING LATHE
Filed Aug. 18, 1922　　　　　5 Sheets-Sheet 5
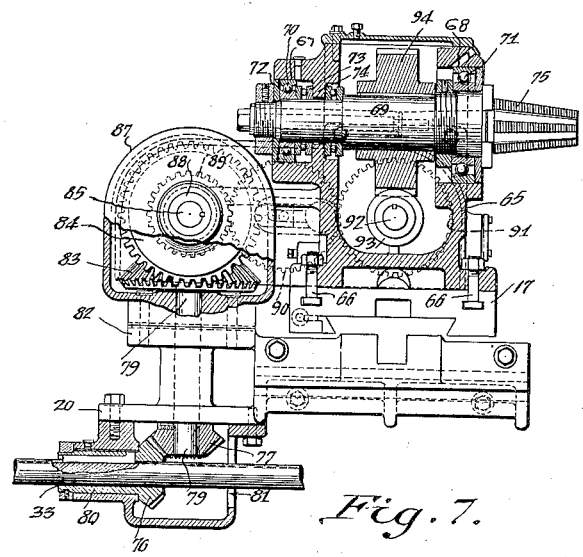
Fig. 7.
Fig. 8.
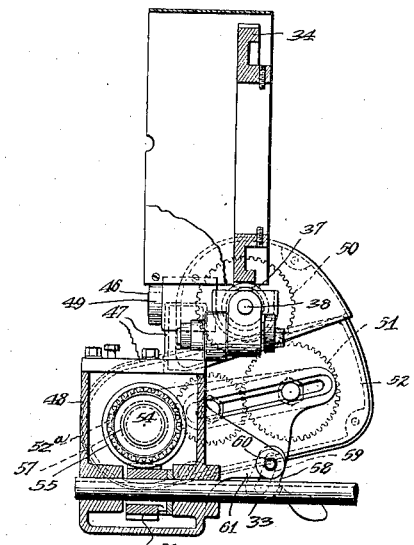
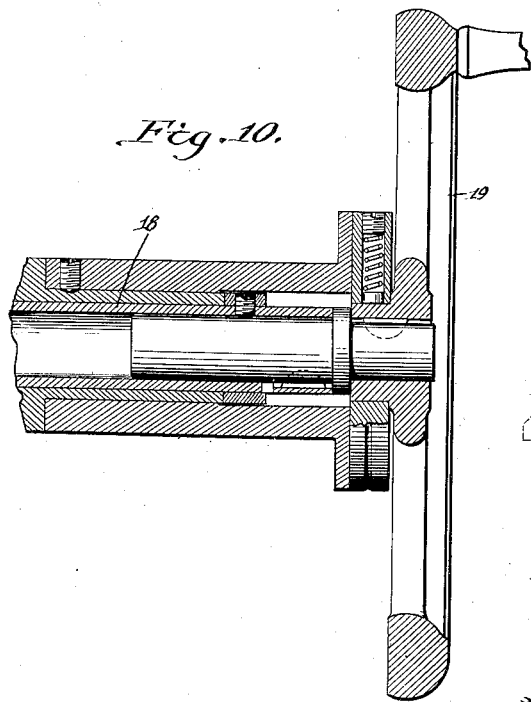
Fig. 10.
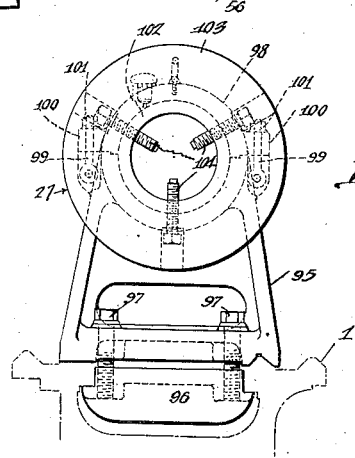
Fig. 9.
Inventor
Francis B. Cockburn.
By Wood & Wood
Attorneys Patented May 12, 1925.

1,537,801

UNITED STATES PATENT OFFICE.

FRANCIS B. COCKBURN, OF CINCINNATI, OHIO, ASSIGNOR TO THE LODGE & SHIPLEY MACHINE TOOL COMPANY, OF CINCINNATI, OHIO, A CORPORATION OF OHIO.

COMBINED TURNING AND MILLING LATHE.

Application filed August 18, 1922. Serial No. 582,649.

*To all whom it may concern:*

Be it known that I, FRANCIS B. COCKBURN, a subject of Great Britain, and residing at Cincinnati, in the county of Hamilton and State of Ohio, have invented a new and useful Improvement in Combined Turning and Milling Lathes, of which the following specification is a full disclosure.

The invention relates to improvements in lathes whereby the machine may be utilized for milling and turning with a single setting of the work.

The carriage of the lathe has its tool-holding slide equipped with a compound rest or holder for carrying the cutters for turning, and with a milling head for supporting and rotating the milling cutter. Both types of cutters with their respective holders are therefore translated upon and with the carriage for feeding the cutters to the work.

Two transmissions are employed for rotating the spindle to which the work is clamped, one comprising the general headstock gearing for rotating the spindle at an appropriate rate for turning and the second as alternate for milling.

It is therefore an object of the invention to provide a commercial engine lathe with devices either as an organized part of the lathe structure or as attachments thereto whereby either turning or milling operations may be performed at a single setting of the work, for more expeditiously and accurately machining the work and increasing the utility of the machine as a metal cutting tool.

Other objects and features of the invention will be more fully set forth in the description of the accompanying drawings forming a part of this application, in which:

Figure 3 is a fragmentary plan showing the tailstock engaged as when turning the work.

Figure 4 is a sectional elevation showing the cross feed tool-slide and related mechanism.

Figure 7 is a vertical sectional detail view through the milling cutter head, and related mechanism.

Figure 8 is a detail sectional view illustrating the change gear mechanism of the spindle drive.

Figure 9 is a detail view of the steady rest.

Figure 10 is an enlarged detail sectional view illustrating an improved connection of the hand lever with the cross feed screw.

Figure 1:
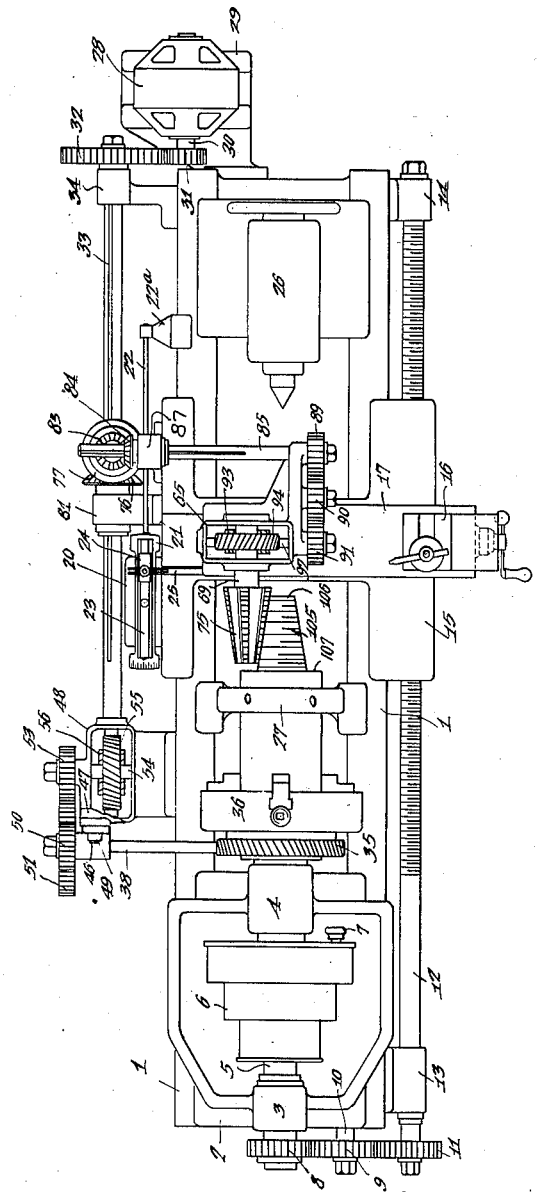
Figure 1 is a plan view of a lathe illustrating the features of this invention and showing the mechanism disposed for a thread milling operation.

Referring to the drawings, 1 indicates the lathe bed upon one end of which is a headstock 2. The general construction of headstock may follow any of the commercial types, and for the purpose herein is of a simpled form sufficient for the special purposes. In this respect, the headstock is provided with a pair of adjoining bearings 3, 4, for journaling the spindle 5. The spindle between the bearings carries a cone pulley 6 which may be connected or disconnected with the spindle by the usual pull pin 7, common in lathe construction, for coupling and uncoupling the cone pulley to a member fixed to the spindle. The spindle on its outer end has a gear 8 fixed thereon in mesh with an intermediate gear 9 journaled on a stud shaft 10 supported in the headstock. The intermediate gear meshes with a gear 11 on the end of a feed or lead screw 12 extending the length of the bed and journaled in suitable brackets 13, 14, fixed upon one side of the bed, at relatively opposite ends thereof. The feed screw traverses the lathe carriage 15 mounted upon the bed, a cross feed tool-slide 17 being translatably mounted upon the carriage, said slide having a tool-holder 16 thereon. The carriage, tool-holder and slide with the feed transmission devices are of commercial type of construction, and therefore are not illustrated or described in detail further than is essential to the understanding of the functions and operation of the machine.

The tool-slide 17 carrying the tool-holder or rest 16, as shown in Figure 4, is translated upon the carriage by the usual feed screw 18 manually rotated by a hand lever 19 and may be transmitted by power from the feed or lead screw 12 through transmission devices, not shown, carried by the apron of the carriage. The tool-holder or rest may also be traversed by taper attachment devices mounted upon the rear end of the carriage. The taper attachment may also represent in construction any of the commercial types well-known in the art, and generally in so far as the details of construction are herein disclosed, comprises a bracket support 20 fixed to and projecting from the rear side of the carriage providing a guideway for the slide-block 21 held against traversing motion with the carriage by a rod 22 fixed at one end, to one end of the slide-block 21 and the opposite end engaged with a stationary bracket 22ª clamped to the bed. The slide 21 carries a swivel-block 23 which is set at a desired angle required for a particular job and which guides the slide shoe 24, which connects with the tool-slide through a connecting rod 25 or the connecting rod may connect with the milling and threading attachment mounted upon the carriage, to which the subject-matter of the invention is particularly directed. The lathe is provided with a commercial type of tailstock 26 movable upon the bed and adapted to be locked in its adjusted position, and also with a follower or revolving rest 27 for supporting the work, an adaptable type of revolving rest being disclosed and described in detail herein.

The invention herein may be referred to as a combined turning and thread milling attachment for lathes, for equipping the lathe so that an operation of thread milling may be performed at the same setting of the work as the turning operation, either external or internal work, such organized machine tool being especially valuable in the oil-well fields for turning and threading the pin and socket, or drilling and finishing tools. The operation of the mechanism will be described in connection with work of such character. The parts to be machined have a taper thread and are so designed that the shoulders must come together at the same time that the threads tighten on the taper. If the piece is turned in an engine lathe and then threaded either by turning or milling in another machine it becomes a tedious and difficult operation to true it up for threading, as the piece is entirely rough except that part on which the thread is cut. With the employment of the milling attachment mounted upon the tool slide of the carriage, the work remains clamped upon the spindle after the turning operations have been completed and the milling cutter brought into position with the work for the necessary milling operations thereon. The milling operation for the work shown is to cut threads on the tapered end thereof. For milling the headstock spindle is rotated or driven by auxiliary transmission mechanism employed for rotating the milling cutter receiving its power from an electric motor 28 mounted upon a platform 29 fixed to and projecting from the lathe bed at the tailstock end of the machine. The armature shaft 30 of the motor 28 carries a pinion 31 engaging with a gear 32 on the end of shaft 33 extending along the rear side of the lathe bed, and at the end carrying the gear 32, is journaled in a bracket 34.

Spindle drive.

For general turning, the spindle is rotated by the transmission mechanism carried within the headstock, herein designated as cone pulley 6, and for milling, through the transmission mechanism driven by the shaft 33 and motor 28.

Figure 5:
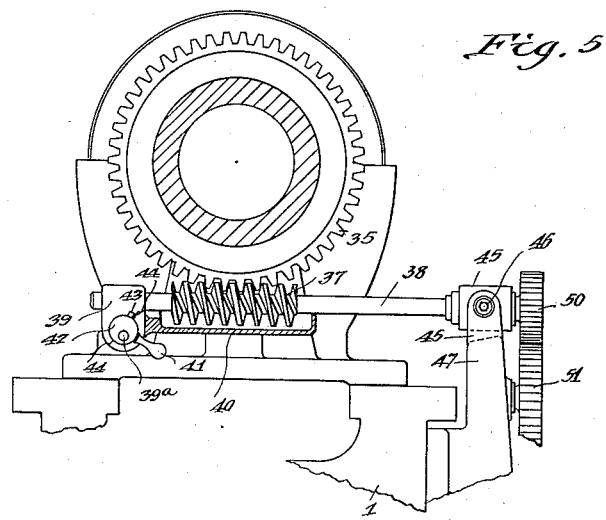
Figure 5 is a detail section through the spindle, illustrating means for connecting the spindle with the milling transmission mechanism.
Figure 6:
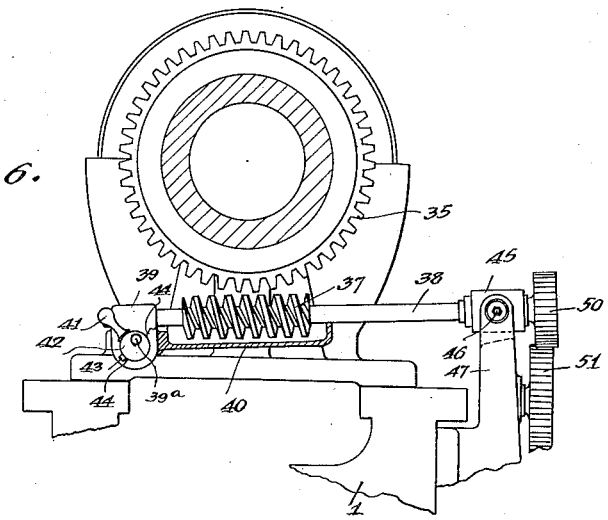
Figure 6 is a similar view showing the means disconnected.

A worm gear 35 is mounted on the headstock spindle 5 in rear of the work-gripping chuck 36 engaged upon the end of the spindle 5. The worm wheel 35 is engaged by a worm 37 secured to shaft 38 (see Figs. 5 and 6), extending transversely of the spindle 5. The shaft is arranged to swing vertically for throwing the worm 37 into and out of mesh with the worm wheel 35, the forward end of the shaft 38 journaling in a swivelled journal fixture 39, having a horizontal box extension 40, providing a housing for the worm 37. The journal fixture 39 is supported on an eccentric stud 39ª supported by the headstock frame. The eccentric is adapted to be rocked by the handle 41 extending from a collar 42 secured to the eccentric. The collar is provided with a stop pin 43, engaging alternately with abutments or shoulders 44, 44, formed upon the journal fixture, for limiting the throw of the eccentric. The pin, when the eccentric is thrown to bring the worm into mesh with the worm wheel, engages a respective shoulder at a location which will permit the eccentric to be moved past the dead center, to prevent the worm from being thrown out of engagement with the worm wheel, when the parts are under load. The opposite end of the worm carrying shaft 38 is journaled and supported in a pivot bearing block 45, having a laterally projecting axis 46 supported in a bracket 47 as a cover for gear casing 48 secured to a seat on the side of the lathe bed. The end of the axis 46 is counterturned and provided with a collar 49, for securing the bearing 45 in position and against displacement upon the bracket 47.

A change gear 50 is keyed on the end of the cross shaft 38 in mesh with another change gear 51 or a plurality of gears, in train on the quadrant 52, one of said gears connecting with change gear 52ª on the end of shaft 54 journaled in gear casing 48 and extending parallel with shaft 38. The shaft 54 has a spiral pinion 55 keyed thereon, engaging with a spiral pinion or worm 56, splined upon shaft 33, which shaft extends along the rear side of the lathe bed. The quadrant 52 is pivoted upon a bushing 57, supported in the gearing casing and about shaft 54, the bushing providing a bearing for said shaft. The quadrant is provided with an ear extension 58, having an arc slot 59, through which a lock bolt 60 is engaged, the bolt also engaging with bracket extension 61, projecting from the rear side of gear casing 48.

From the foregoing it will be observed that the spindle for milling is transmitted by shaft 33, through spiral pinions 55, 56, shaft 54, change gears 51 connecting said shaft 54 with shaft 38, worm 37 on shaft 38, and worm wheel 34 on the main spindle.

*Milling cutter head.*

The milling cutter head comprises a casing 65, mounted on a rear extension of the compound rest base or slide 17 and secured to the slide by T-slot bolts 66 engaged into the T-groove in the face of the slide, so that the cutter head may be positioned as conditions may require. The casing or housing 65 provides spaced oppositely disposed bearing openings 67, 68, within which the cutter spindle 69 is journaled and sustained. The spindle 69 is carried on two radial ball bearings 70, 71, respectively mounted in the bearing openings 67, 68. Bearing 70, within the recess or opening 67, on one side engages against a collar 72, mounted upon the spindle, the opposite side of the ball bearing engages against a ball thrust bearing 73. The thrust ball bearing 73 engages an annular should 74 as the base of the recess. A second ball thrust bearing is disposed at the opposite side of said shoulder 74, and between said shoulder and a shoulder on the spindle 69. The forward or nose end of the spindle is arranged to receive the tapered shank end of the milling cutter 75, so as to be rotative with the spindle. The transmission for the spindle comprises a miter gear 76, splined upon the shaft 33 and in mesh with a miter gear 77 on a vertical shaft 79. The miter gear 76 is provided with a hub 80 journaled in a bearing in the casing bracket 81 suspended from bracket 20 of the taper attachment fixed to the lathe carriage, so as to traverse with the carriage. The vertical shaft 79 is supported and journaled in a journal bracket 82 as a part of the bracket 20 or casing fixture secured to the carriage and from which the journal bracket 81 is directly suspended. All journal bearings or brackets may be referred to as a part of the carriage as a unit. To the upper end of shaft 79 is keyed a miter gear 83 in mesh with a miter gear 84 splined to a horizontal shaft 85 carried by the cutter head casing or tool fixture 65. The gear 84 is provided with a hub extension on one side, journaled in a bearing in the housing 87, secured upon the bracket 82, and held against axial displacement by the collar 88 fixed to the hub. The horizontal shaft is splined longitudinally for traversing the same through the gear 84 as the tool-slide is translated or fed upon the carriage. The inner end of the shaft 85 has a change gear 89 keyed thereon, said gear meshing with an intermediate gear 90, which in turn meshes with a gear 91 on the end of shaft 92 journaled in the head housing or casing 65. A spiral or worm gear 93 is keyed upon shaft 92, within the housing 65 and engages into a spiral gear 94 keyed upon the cutter spindle 69. Thus the cutter spindle is rotated by the same shaft which imparts motion to the headstock spindle, the transmission gearing connecting the shaft 33 with the cutter spindle, providing for the cutter to be fed transversely to the axis of the work chucked to the main spindle of the lathe.

*Steady rest.*

The steady rest may be of any commercial type of construction generally employed on lathes, the type disclosed being of a form preferred for the special work contemplated to be machined.

It comprises a bracket 95 mounted upon the lathe bed and secured in position by a clamp bar 96 engaged between the rails of the bed and secured to the bracket 95 by means of bolts 97. The head portion of the bracket is arranged to provide a bearing and of two-part form, one part or section 98 being removable from the bracket or body portion 95. Eye bolts 99—99 at opposite sides of the bearing are pivotally connected to the body portion and engaged each respectively between space lugs 100 projecting from the cap member 98, the upper surface of the lugs providing seats for the clamp nut 101 engaged upon the eyebolt. A revolvable ring 102 is journaled within said bearing formed by the members 95, 98. The ring has an annular flange 103 radiating from one end through which a series of equally spaced set screws 104 are engaged, three being shown. The screws are adjustable into the bore of the rings for accurately centering and holding the work axially true with the center of the lathe during a milling operation.

Figure 2:
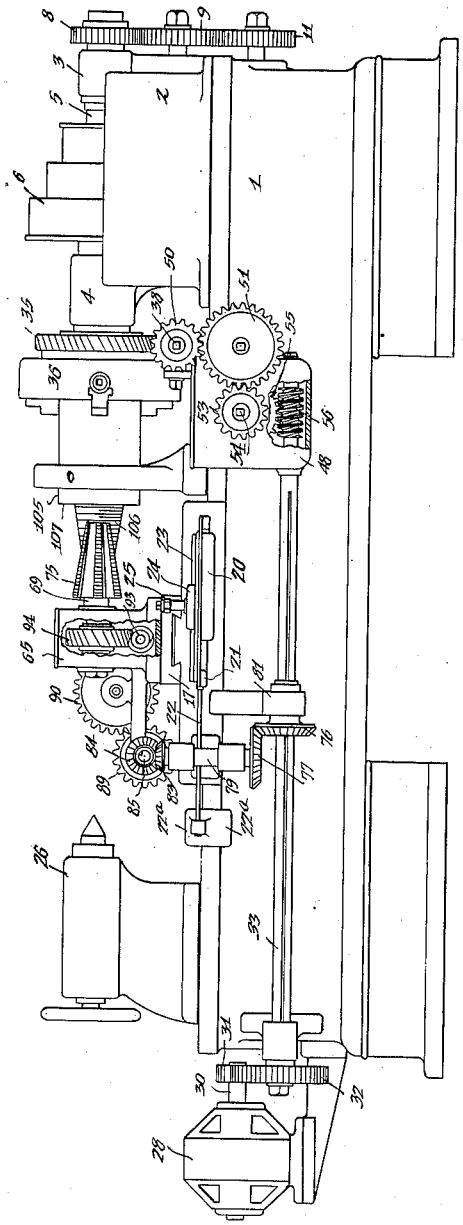
Figure 2 is a side elevation of the structure of Figure 1, taken from the rear.

For the purpose of exemplifying the operation of the machine, an oil-well boring tool 105, as work of the class for which the machine is particularly adaptable, is shown as gripped in the jaws of chuck 36. The work is engaged through and supported by a steady rest 27 with the tapered end 106 to be machined extended beyond the steady rest. The work for turning is mounted within the lathe in the ordinary manner for turning, one end being gripped in the chuck on the end of the lathe spindle as shown in Figs. 1, 2 and 3, and the outer end centered and supported in the dead center of the tailstock 26, as in Figure 3. The steady rest for the turning operation may either be entirely removed, or moved out of way toward the headstock, so as to allow movement of the carriage and tool-rest for turning the body portion of the work. In the latter instance the screws 104 are moved outwardly to clear the work. During this operation the milling cutter head is moved rearward upon or with the tool slide as shown in Figure 3 to make clearance for the tailstock. This also brings the turning tool on the tool-holder 16 into position. The tool may be either fed by the cross feed mechanism of the carriage for straight turning or the taper attachment may be utilized for turning the required taper. With the compound tool-rest 16 provided with a multiple toolholder roughing and finishing cuts may be taken as required. This however is merely a shop expedient, and the turning may follow any of the prevailing methods used for general or taper turning.

After the completion of the turning operation, the steady rest 27 is brought into position and the set screws 104 adjusted to the work and tightened, care being taken to avoid springing of the work which is still held within the chuck and on the tailstock center. The tailstock may then be removed to the end of the lathe bed to a clearance position which will not interfere with the positioning of the milling cutter head, which is then brought into milling position by means of the cross feed screw in the carriage. The cutter for threading the tapered end of oil-well tools is brought up to the work until it touches the outside of the work, and a sufficient distance from the shoulder 107 to allow for one and a fraction revolutions of the work to complete the thread and give the proper thread distance from the shoulder. The graduated dial of the cross feed screw is then set to register the required depth of thread from the zero mark in such a dirction that when the screw is rotated to feed the cutter into the work the dial will travel toward the zero mark, and when the zero mark on the dial registers with the zero mark on the indicator the proper depth of thread will have been reached.

This initial setting of the cutter relative to the work is a hand operation. The cutter is of a length to cut the entire length of the screw in one and a fraction revolution of the work. Thus, as shown in Fig. 1 of the drawings, the forward end of the cutter is approximately one and one half threads from the shoulder while the rear end is extended beyond the end of the work to be threaded. After the cutter has been properly set, the carriage feed mechanism is connected with the lead screw, so that the carriage is fed at the time of starting the cut. The spindle is then connected with the slow auxiliary transmission, and at the same time the milling cutter is fed into the work by hand. The cutter is fed into the work to the full depth, from a fraction of a turn of the work. The full depth is determined, as previously set forth, by the indicator mechanism of the cross feed screw. The point at which the cutter reaches its full depth is noted on the work, from which the work is allowed to make one and a fraction revolution, so that the thread cutting is accomplished for the full length of the work in one and a fraction revolution of the work, after which the cutter is withdrawn and motion of the machine stopped.

The tool-slide being connected with the taper attachment moves the cutter along the desired taper of work, the carriage being fed or translated the required degree during the cutting cycle.

As it is necessary to obtain a definite distance between the thread and shoulder 105, so that the abutting shoulder of the connected parts must come together at the same time that the threads tighten on the taper, a master gauge is screwed on the thread of the work while clamped to the spindle, which gauge is short of the length of the threaded portion of the work, so as to leave a space between its end and the shoulder 105. This space must measure a definite distance to insure the proper union of the coupling members. Allowance is made in starting the thread cut so that the shoulder will require a slight dressing, which is accomplished by the lathe cutters on the compound rest which are brought into operative position. A gauge block is generally employed with which the distance between the end of the master gauge and shoulder is determined.

The turning and threading of a mating coupling part follows the same operation as above described, except that the machine is internal instead of external.

The proportions as to the ratio of tool translation and work rotation is geometrically determined by the pitch of the thread, the transmission gearing employed being of a spaced change type, the respective feed and speed ratios conveniently established to meet the required range.

Having described my invention, I claim:

1. In a machine tool, a rail base, a headstock carrying a work-supporting spindle mounted on one end of said base, a carriage translatable upon said rail base, transmission mechanism for rotating said spindle and traversing said carriage, a tool-slide mounted on said carriage, a tool-holder carrying a stationary tool mounted on one end of said slide and a second tool-holder for supporting and rotating a milling cutter mounted upon the opposite end of said slide, a shaft journaled upon one side of said base and extending longitudinally thereof, and transmission means mounted on said carriage connecting with said shaft for rotating said cutter.

2. In a metal working machine, a bed, a rotary work-carrying spindle, a carriage translatable upon said bed, a feed screw for translating said carriage, transmission means for rotating said spindle and screw, including gearing connecting said spindle and screw, a shaft journaled on one side of said bed, transmission gearing adapted to connect said spindle and shaft, a rotating milling tool-holder having a tool-holding spindle mounted on said carriage, and gearing carried by said carriage connecting said tool-holding spindle and shaft.

3. In a metal working machine, a bed, a rotary work-carrying spindle journaled upon one end of the bed, a driving shaft journaled longitudinally of said bed, gearing adapted to connect said shaft and spindle, a carriage translatable upon said bed, a cross feed tool-carrying slide slidably mounted upon said carriage, a tool-holder mounted upon one end of said slide, a milling cutter head fixed upon the opposite end of said slide having a rotary tool-carrying spindle, gearing mounted on and translatably with said carriage connecting with said driving shaft, and gearing journaled on said milling cutter head translating as a unit therewith connecting with said tool carrying spindle and including a shaft having a sliding connection with said gearing on said carriage.

In witness whereof, I hereunto subscribe my name, as attested by the two subscribing witnesses.

FRANCIS B. COCKBURN.

Witnesses:
L. A. BECK,
R. KISTNER.